United States Patent [19]
Yoshida

[11] Patent Number: 5,168,362
[45] Date of Patent: Dec. 1, 1992

[54] APPARATUS FOR DISPLAYING STANDARD ASPECT RATIO TELEVISION SIGNAL ON WIDE ASPECT RATIO DISPLAY SCREEN

[75] Inventor: Chisato Yoshida, Saitama, Japan

[73] Assignee: Sony Corporation, Tokyo, Japan

[21] Appl. No.: 691,817

[22] Filed: Apr. 26, 1991

[30] Foreign Application Priority Data
May 1, 1990 [JP] Japan .................................. 2-111739

[51] Int. Cl.⁵ .......................... H04N 5/16; H04N 5/18
[52] U.S. Cl. .................................... 358/171; 358/172; 358/34; 358/140
[58] Field of Search ................... 358/230, 140, 11, 12, 358/141, 142, 22, 183, 171-174, 176, 178, 168-169, 188, 180, 181, 34

[56] References Cited
U.S. PATENT DOCUMENTS 4,403,254  9/1983  Okada et al. ........................ 358/171
4,631,589 12/1986  Hongu et al. ....................... 358/171
4,729,026  3/1988  Suzuki et al. ...................... 358/168
4,811,101  3/1989  Yagi .................................... 358/172
4,984,078  1/1991  Skinner et al. ..................... 358/140
4,984,081  1/1991  Miyoshi .............................. 358/140

Primary Examiner—James J. Groody
Assistant Examiner—Michael H. Lee
Attorney, Agent, or Firm—Lewis H. Eslinger; Jay H. Maioli

[57] ABSTRACT

An image display apparatus includes an automatic pedestal processing circuit for detecting the minimum signal level of the input video signal for controlling the signal level of the video signal on the basis of the results of the detection. A control section is provided for activating the automatic pedestal processing circuit during the effective display period for the input video signals to prevent malfunction of the automatic pedestal processing section and to display an image with superior picture quality.

6 Claims, 10 Drawing Sheets

APPARATUS FOR DISPLAYING STANDARD ASPECT RATIO TELEVISION SIGNAL ON WIDE ASPECT RATIO DISPLAY SCREEN

BACKGROUND OF THE INVENTION

1. Field of the Invention

This invention relates to an image display apparatus provided with an automatic pedestal processing section for detecting the minimum signal level of input video signals and controlling the signal level of the video signals on the basis of the detected results. The present invention may be applied to, for example, an image display apparatus, such as a television receiver having display means in the form of a display raster or screen having a wide aspect ratio.

2. Description of the Prior Art

An image display apparatus, such as a television receiver, adapted for displaying an image by image signals or video signals by on a display means such as a Braun tube or liquid crystal display, has been known widely. With such image display apparatus, an automatic pedestal processing section for detecting the minimum signal level of the input video signals and controlling the signal level of the video signals on the basis of the detected results is provided in the image signal processing system for displaying an image with excellent picture quality by effective exploitation of the dynamic range of the display means.

Meanwhile, with the present television broadcasting system, the display screen has an aspect ratio of 4:3. In a second generation extended definition TV (EDTV), scheduled to be practiced in future, or a high quality television broadcasting system, such as so-called "high vision" broadcasting system, a widescreen having an aspect ratio of 16:9 is scheduled.

Thus it is estimated that television broadcasting in the future will be made with both the presently adopted standard aspect ratio of 4:3 and the wide aspect ratio of 16:9. For this reason, development of an image display apparatus adapted for displaying images of both types of image signals is proceeding at present.

In such image display apparatus, various display systems such as shown in FIGS. 1 to 4 are presently proposed as the system for displaying the image of the video signals with the standard aspect ratio of 4:3, using display means for the display screen having a wide aspect ratio of 16:9, as an example.

In the first system, upper and lower regions $P_1$ and $P_3$ of an image $P_N$ of image signals having a standard aspect ratio are cut as shown in FIG. 1 to display an image $P_3$ on the entire display screen having a wide aspect ratio. With this first system, the image is displayed on the display screen of the wide aspect ratio by overscanning in the vertical direction of the screen without meddling with the image signals of the standard aspect ratio.

In the second system, as shown in FIG. 2, a right-hand side region $A_R$ of the display raster of the wide aspect ratio is masked and the image $P_N$ of the image signals of the standard aspect ratio is displayed in the left-hand side region of the display raster of the standard aspect ratio. With the second system, the image signals having the standard aspect ratio are compressed along the time axis to three-fourths in the horizontal direction in conformity to the difference in the aspect ratio relative to the display raster of the wide aspect ratio. Frame signals displaying the right-hand side region $A_R$ by, for example, a black tint, are annexed, and the image display is made on the display screen of the wide aspect ratio by usual raster scanning.

In the third system, shown in FIG. 3, left- and right-hand side regions $A_{LO}$ and $A_{RO}$ of the display raster having the wide aspect ratio are masked and the image $P_N$ of the image signals having the standard aspect ratio is displayed at the center of the display screen of the wide aspect ratio. With this third system, image signals of the standard aspect ratio are compressed along the time base to three-fourths in the horizontal direction, in conformity to the difference in aspect ratio relative to the display screen of the wide aspect ratio. Frame signals associated with the left- and right-hand side regions $A_{LO}$ and $A_{RO}$ are affixed and display is made on the display screen of the wide aspect ratio by usual raster scanning.

In the fourth system, shown in FIG. 4, a left-hand side region $A_L$ of the display screen having the wide aspect ratio is masked, and the image $P_N$ of the image signals of the standard aspect ratio is displayed on the right-hand side of the display screen having the wide aspect ratio. With this fourth system, the image signals of the standard aspect ratio are compressed along the time base to three-fourths in the horizontal direction, in conformity to the difference in the aspect ratio relative to the display screen of the wide aspect ratio. Masking signals associated with the left-hand side region $A_L$ are affixed and display is made on the display screen of the wide aspect ratio by the usual raster scanning.

Meanwhile, with the image display apparatus, adapted for displaying the image of the wide aspect ratio and the image of the standard aspect ratio by display means consisting of the display screen having the wide aspect ratio, a problem is raised in that, when an automatic pedestal processing section is provided for improving the picture quality of the displayed image, the masking signal having the signal level within the range of level detection by the automatic pedestal processing section is erroneously detected as being of the black level, so that the automatic pedestal processing section is erroneously actuated and hence it becomes impossible to make image display in such a manner as to take advantage effectively of the dynamic range of the display means.

OBJECT AND SUMMARY OF THE INVENTION

The present invention has been made in view of the above status of the art. A principal object of the present invention is to provide an image display apparatus adapted for displaying an image of the wide aspect ratio and an image of the standard aspect ratio by display means consisting of the display screen of the wide aspect ratio, in which mistaken actuation of the automatic pedestal processing section may be prevented and an image display may be made in such a manner as to take advantage of the dynamic range of the display effectively.

According to the present invention, the automatic pedestal processing section, controlled in operation by a control section, is operated only during the effective display period for input image signals so as to detect the minimum signal level of the input image signals to control the signal level of the image signals on the basis of the detected results. In this manner, with the image display apparatus according to the present invention, mistaken operations of the automatic pedestal processing section due to detection of signals occurring during the ineffective display period other than the effective display period may be eliminated and the dynamic range of the display means may be effectively exploited to enable image display with the desired excellent picture quality.

DETAILED DESCRIPTION OF PREFERRED EMBODIMENT

Figure 1:
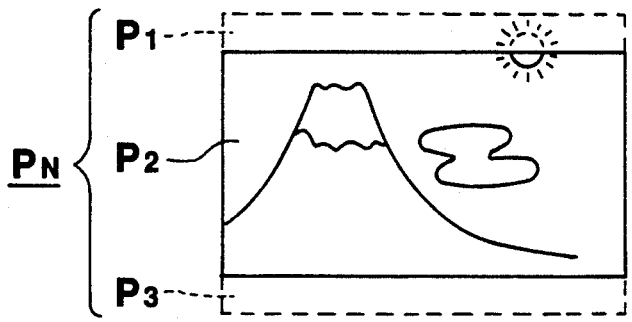
FIG. 1 is a schematic front view showing an image displayed in the first system according to which upper and lower regions of the image by the image signals with the standard aspect ratio are cut and the image display is made on the overall display screen having the wide aspect ratio.
Figure 2:
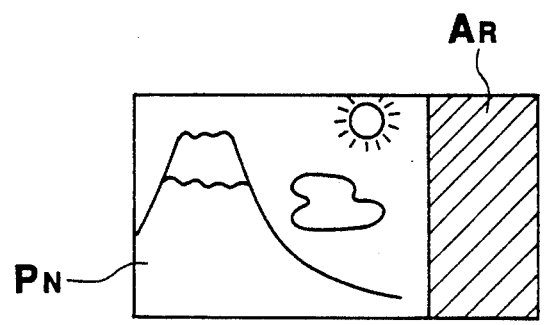
FIG. 2 is a schematic front view showing an image displayed in the second system according to which a right-hand side region of the display screen having a wide aspect ratio is masked and the image of the image signals with the standard aspect ratio is displayed on the left-hand side region of the display screen having the wide aspect ratio.
Figure 3:
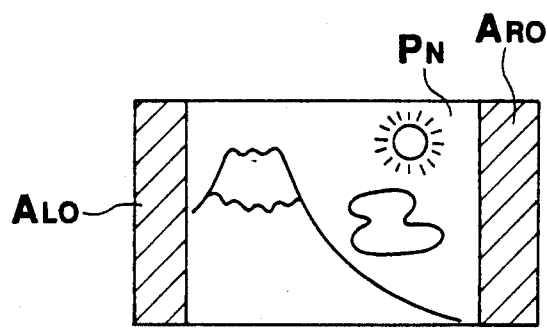
FIG. 3 is a schematic front view showing an image displayed in the third system according to which left- and right-hand side regions of the display screen having a wide aspect ratio are masked and the image of the image signals with the standard aspect ratio is displayed at the center of the display screen having the wide aspect ratio.
Figure 4:
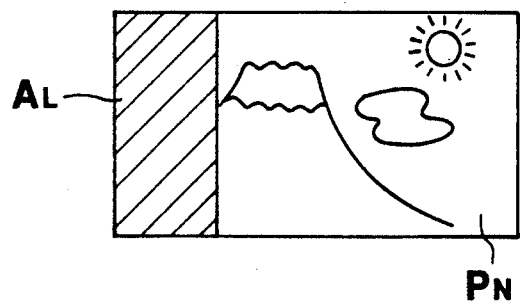
FIG. 4 is a schematic front view showing an image displayed in the fourth system according to which a left-hand side region of the display screen having the wide aspect ratio is masked and the image of the image signals with the standard aspect ratio is displayed on the right-hand side region of the display screen having the wide aspect ratio.

By referring to the drawings, an illustrative preferred embodiment of the image display apparatus according to the present invention will be explained in detail.

Figure 5:
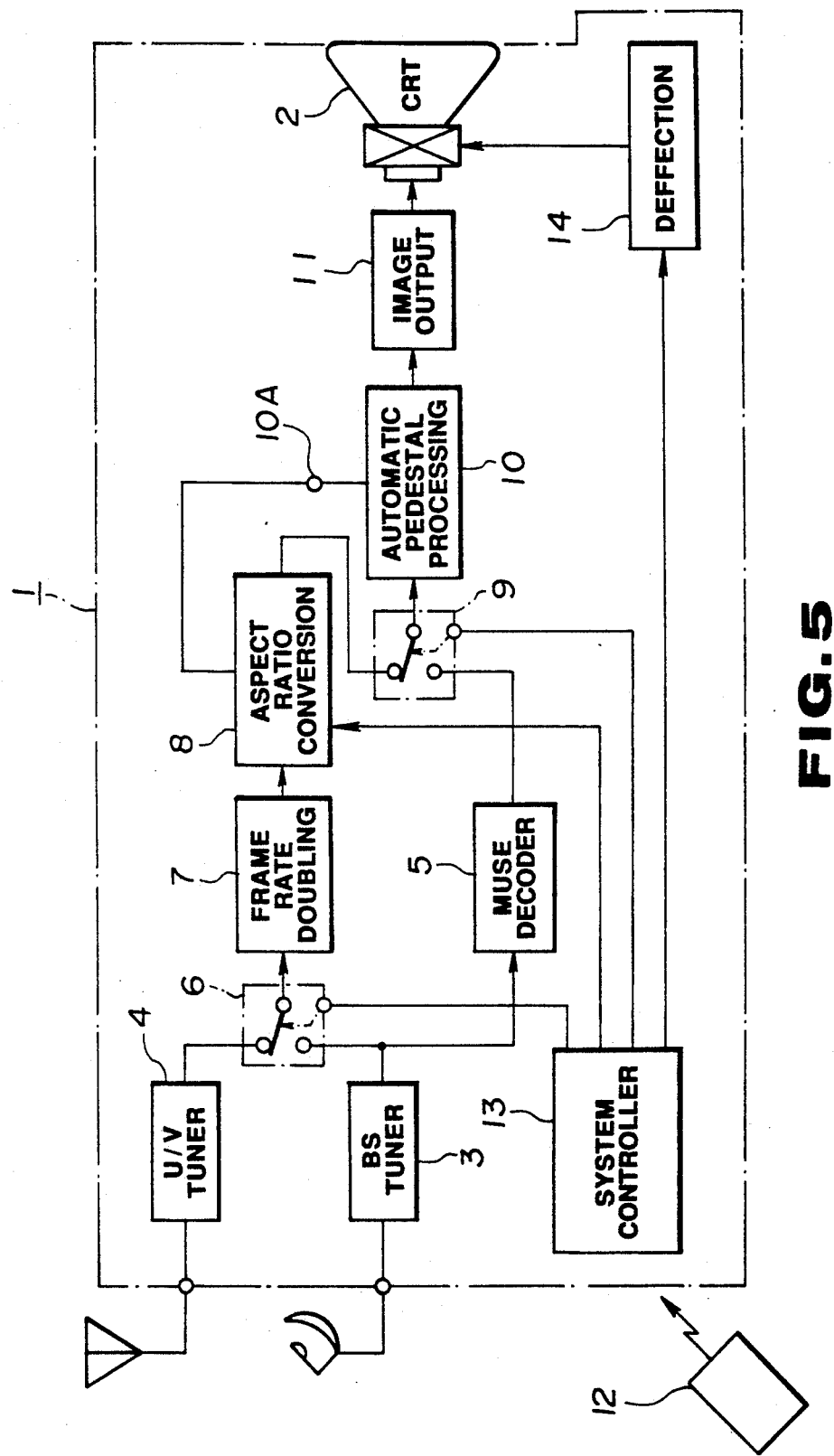
FIG. 5 is a block diagram showing an arrangement of an image display apparatus according to the present invention.

In an image display apparatus 1, shown in FIG. 5, the present invention is applied to a high definition television receiver displaying an image by a picture tube 2 having a display raster of a wider aspect ratio of 16:9.

The image display apparatus 1 has a broadcast satellite (BS) tuner circuit 3 for transmitting and receiving signals of satellite broadcasting and a UHF/VHF (U/V) tuner circuit 4 for transmitting and receiving ground waves.

The MUSE signals, obtained as the reception output by the BS tuner circuit 3 of the high definition broadcasting, are supplied to a MUSE decoding circuit 5 and thereby decoded into high quality video signal.

The video signals of the NTSC system, obtained as the reception output by the BS tuner circuit 3 or the U/V tuner circuit 4, are supplied to a frame rate doubling conversion circuit 7 by means of an input changeover switch circuit 6. The frame rate doubling conversion circuit 7 processes the NTSC system video signals from the BS tuner circuit 3 or the U/V tuner circuit 4 by frame rate doubling conversion whereby the interlaced scanning mode video signals are converted into sequential scanning mode video signals or double-rate video signals. The double-rate video signals, obtained by the frame rate doubling conversion circuit 7, are supplied to an aspect ratio converting circuit 8. This aspect ratio converting circuit 8 processes the double-rate video signals from the frame rate doubling conversion circuit 7 by aspect ratio conversion whereby the image having a standard aspect ratio of 4:3 according to the NTSC system is to be displayed on the display screen of the picture tube 2 in accordance with any of the above mentioned first to fourth display systems. The circuit 8 also generates a control signal for indicating the effective display period of the image signals in each of the above display systems by, for example, a logical "H" level.

The high quality video signals, obtained upon decoding the MUSE signals by the MUSE decoding circuit 5, and the double-rate video signals, processed by the aspect ratio converting circuit 8 by aspect ratio conversion, are selectively supplied to an automatic pedestal processing circuit 10 by means of a signal changeover switch circuit 9. The automatic pedestal processing circuit 10 remains in operation during the time period when the control signal of the logical "H" level is supplied to its control input terminal 10A to detect the minimum signal level of the input video signals and processes the input video signals by automatically controlling the signal level of the video signals in their entirety on the basis of the detected signal level. The video signals, the signal level of which has been controlled automatically by the automatic pedestal processing circuit 10, are supplied to the picture tube 2 by means of an image output circuit 11 for displaying the image on a display screen of the picture tube 2 having the wider aspect ratio of 16:9.

The image display apparatus 1 includes a system controller 13 for accepting the control input by a remote controller 12 to execute various control operations, such as switching control of the switching circuits 6 and 9, operational control of the aspect ratio converting circuit 8 and deflection angle switching control of the picture tube 2.

Figure 6:
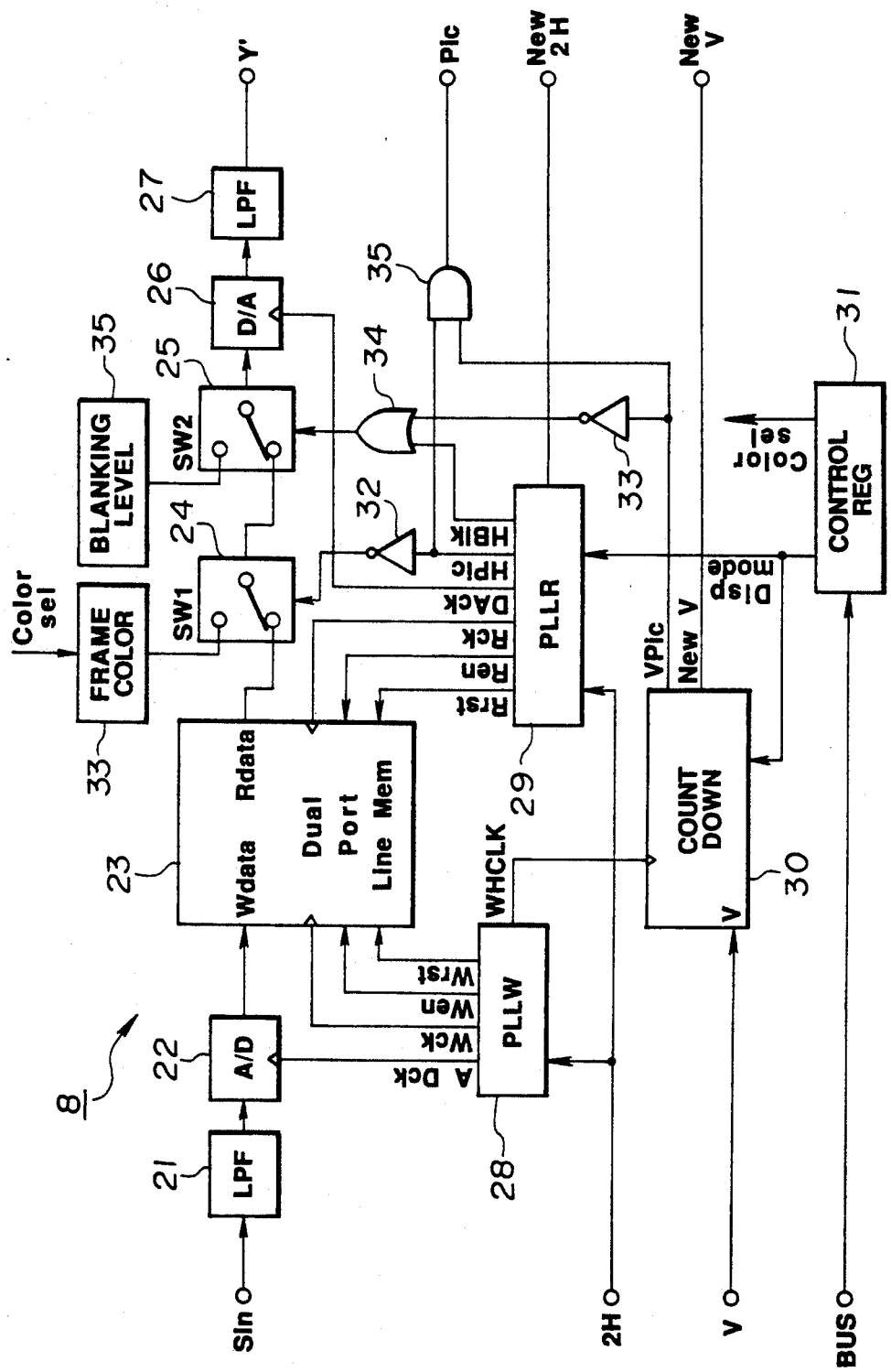
FIG. 6 is a block diagram showing an arrangement of an aspect ratio converting circuit of the image display apparatus shown in FIG. 5.

The aspect ratio converting circuit 8 of the image display apparatus 1 of the present embodiment is constructed as shown for example in FIG. 6.

Thus, as shown in FIG. 6, the aspect ratio converting circuit 8 includes an analog/digital converter 22 for digitizing the input video signals, that are bandwidth-limited by a low-pass filter 21, a dual-port line memory 23 for processing the video data digitized by A/D converter 22 by time-base compression, a frame data annexing circuit 24 for annexing frame data to the video data read out from line memory 23, a blanking data annexing circuit 25 for annexing blanking data to the video data to which the frame data have been annexed by the frame data annexing circuit 24, a digital-analog converter 26 for converting the video data, to which the blanking data have been annexed by the blanking data annexing circuit 25, into corresponding analog data and outputting the resulting analog data by means of a low-pass filter 27, a write clock generating circuit 28 for generating the video data writing timing to line memory 23, a readout clock generating circuit 29 for generating the video data readout timing from line memory 23, and a count-down circuit 30 for generating the timing necessary for vertical image processing.

Figure 7:
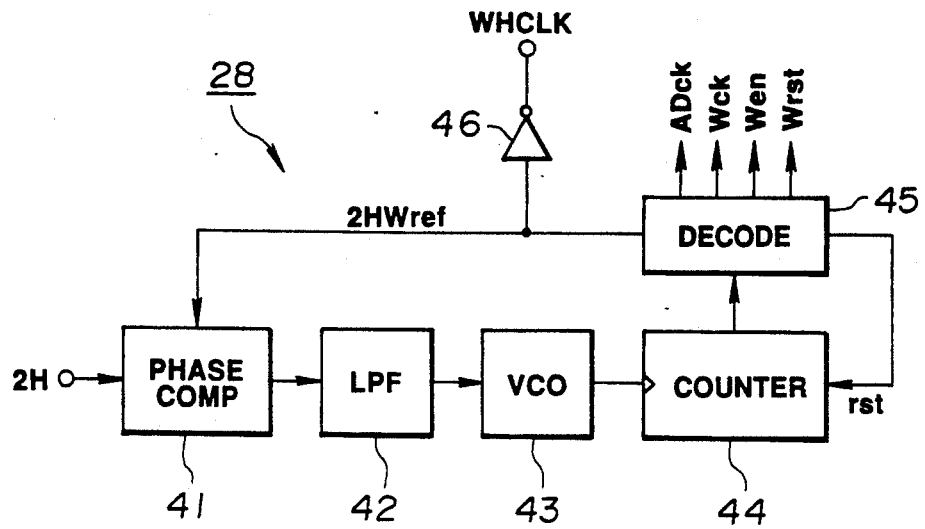
FIG. 7 is a block diagram showing an arrangement of a write clock generating circuit of the aspect ratio converting circuit shown in FIG. 6.

The write clock generating circuit 28 is a PLL circuit for forming 8 $f_{SC}$ reference signals necessary for A/D conversion or writing in the memory, and is constituted by a phase comparator 41, to which the double-rate horizontal sync signals 2H, formed in the frame rate doubling conversion circuit 7, are supplied as the reference signals, a voltage controlled oscillator 43, to which an output of phase comparison by the phase comparator 41 is supplied as the control signal by means of a low-pass filter 42, a counter circuit 44 counting the oscillation output of the voltage controlled oscillator 43, and a decoding circuit 45 decoding the count output from the counter circuit 44, as shown for example in FIG. 7.

Figure 8:
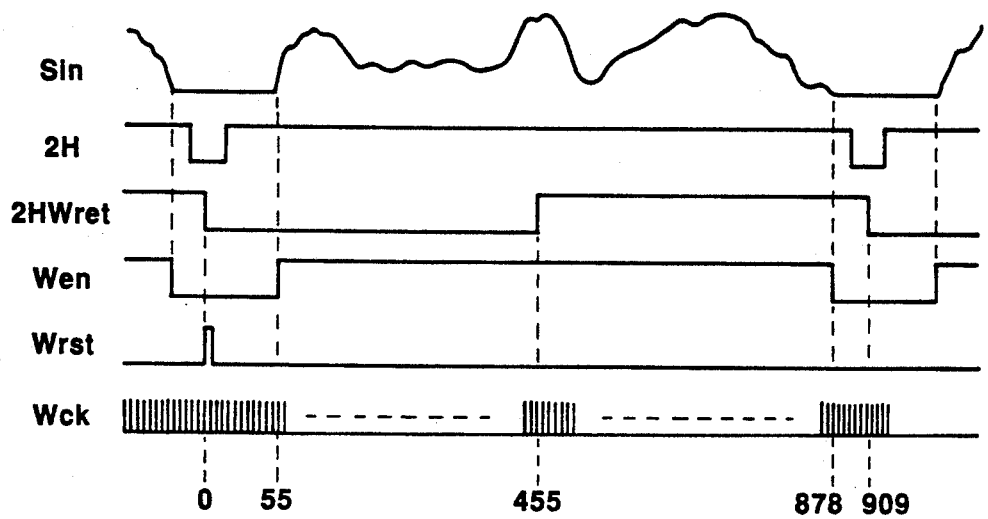
FIG. 8 is a time chart for illustrating the operation of the write clock generating circuit shown in FIG. 7.

In the write clock generating circuit 28, a signal having a frequency of approximately 28 MHz, or 910 times the frequency of the horizontal sync signals 2H, is generated by the voltage-controlled oscillator 43 and frequency-divided by 1/910 by the counter circuit 44 and the decoder circuit 45 to form a comparison signal $2HW_{ref}$, which comparison signal $2HW_{ref}$ is phase-compared in the phase comparator 41 with the horizontal sync signal 2H, in a closed loop configuration. The count output from the counter circuit 44 is decoded by the decoding circuit 45 to produce clock signals $AD_{ck}$ for providing an operational timing of the A/D converter 22, write clocks $W_{ck}$ for providing the video data write timing to the line memory 23, write control signals $W_{en}$ for delimiting the write domain in the line memory 23, and reset control signals $W_{rst}$ for initializing the write address pointer in the line memory 23. The waveforms of these signals are shown in FIG. 8.

Figure 9:
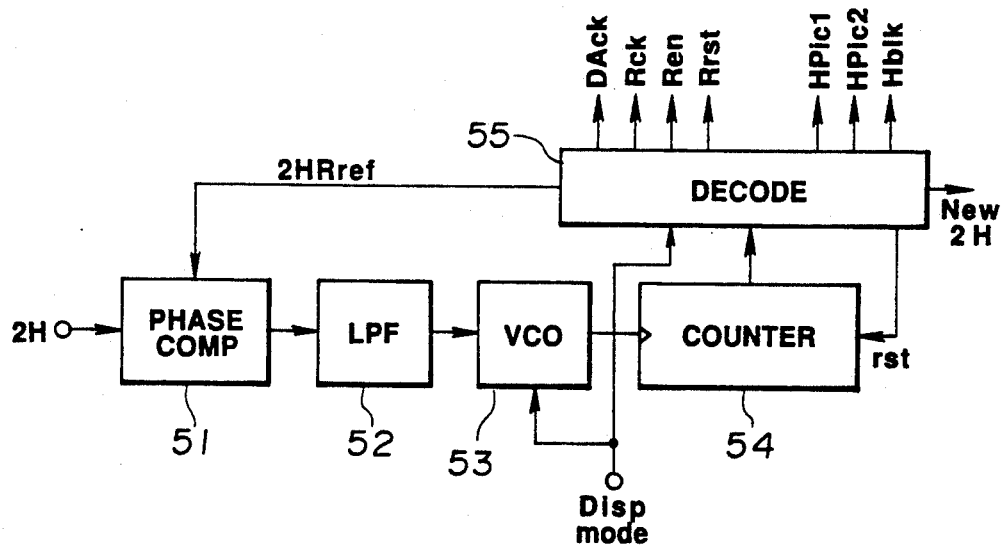
FIG. 9 is a block diagram showing an arrangement of a readout clock generating circuit of the aspect ratio converting circuit shown in FIG. 6.

The readout clock generating circuit 29 is a PLL circuit for forming reference signals necessary to perform the readout operation from the memory, and is adapted for generating the two types of reference signals as a function of the operating modes. As shown for example in FIG. 9, the readout clock generating circuit 29 is constituted by a phase comparator 51, to which the double-rate horizontal synchronizing signals 2H, formed in the above mentioned frame rate doubling conversion circuit 7, are supplied as the reference signals, a voltage controlled oscillator 53, to which the phase comparison output from the phase comparator 51 is supplied as the control signal by means of a low-pass filter 52, a counting circuit 54 for counting the oscillation output of the voltage controlled oscillator 53 and a decoding circuit 55 for decoding the count output of the counting circuit 54.

In the readout clock generating circuit 29, the operation of each of the voltage controlled oscillators 53 and the decoding circuit 55 is switched by control data in conformity to the display mode supplied from the system controller 13 to the control register 31. Thus, on reception of control data of the display mode according to the above mentioned first display system (mode 0 control data), the readout clock generating circuit 29 constitutes a PLL circuit generating reference signals having the frequency of 8 fsc, similar to the above mentioned write clock generating circuit 28 and, on reception of control data of the display mode according to the above mentioned second to fourth display systems (mode 1 to 3 control data), the readout clock generating circuit 29 constitutes a PLL circuit generating reference signals having the frequency of 8 $f_{SC}$, similar to the write clock generating circuit 28. Likewise, on reception of control data according to the above mentioned first to fourth display systems (mode 1 to 3 control data), the circuit 29 constitutes a PLL circuit generating reference signals having the 4/3-fold frequency, that is the frequency equal to 1213 times the above mentioned reference frequency 2H, or about 38 MHz.

Figure 10:
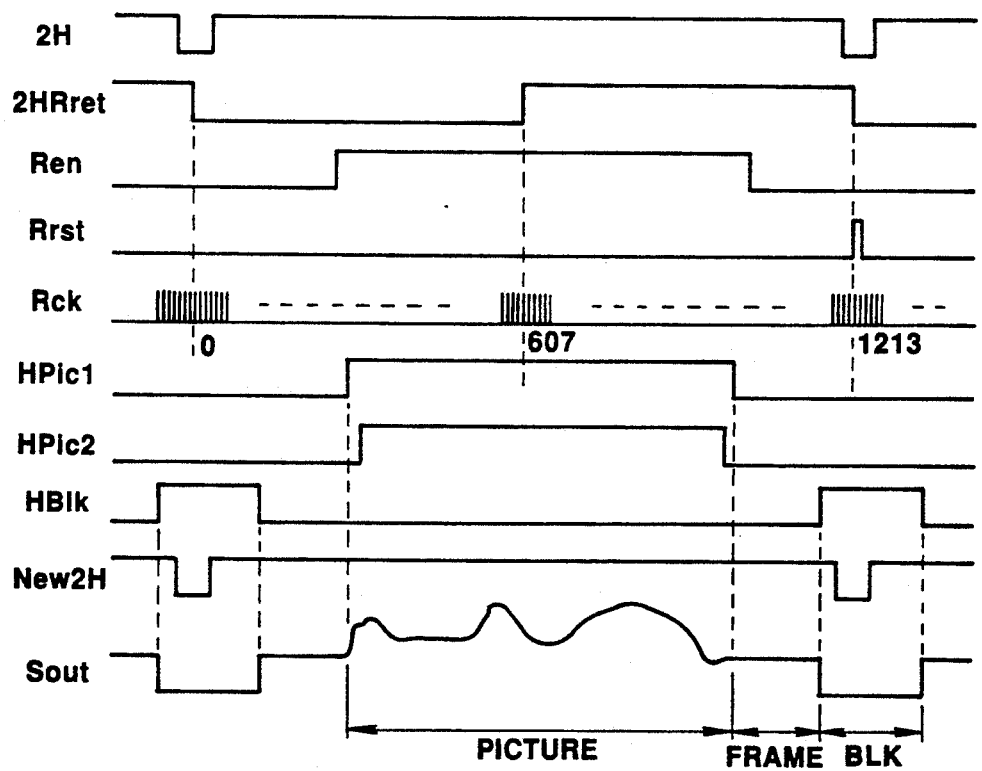
FIG. 10 is a time chart for illustrating the operation of the readout clock generating circuit shown in FIG. 9.

Referring to FIG. 10, the decoder circuit 55 decodes the count output from the counter circuit 54 to generate clock signals $DA_{ck}$ for providing the operational timing for the D/A converter 26, readout clocks $R_{ck}$ for providing the readout timing for reading out image data from line memory 23, write control signals $R_{en}$ for delimiting the readout domain of the line memory 23, reset control signals $R_{rst}$ for initializing a readout address pointer in the line memory 23, control signals $HP_{ic}$ necessary for frame data addition and automatic pedestal processing, control signals $HB_{lk}$ necessary for blanking data addition, and new horizontal synchronizing signals NEW 2 H.

The timing of generation of each of the control signals $R_{en}$, $R_{rst}$ and $HP_{ic}$, generated by the readout clock generating circuit 29, is switched by control data supplied to the control register 31. Thus the signals $R_{en}$, $R_{rst}$ and $HP_{ic}$ are generated at the timings conforming to the display position in the image display screen in accordance with the display modes (modes 0 to 3).

FIG. 10 shows the case of the display mode according to the above mentioned third system (mode 2).

It is noted that stabilized timing generation may be realized with the readout clock generating circuit 29 even when no signals are received during broadcast reception and no reference signals 2 H are received, because the voltage controlled oscillator 53 may continue its operation in the free-running state.

Figure 11:
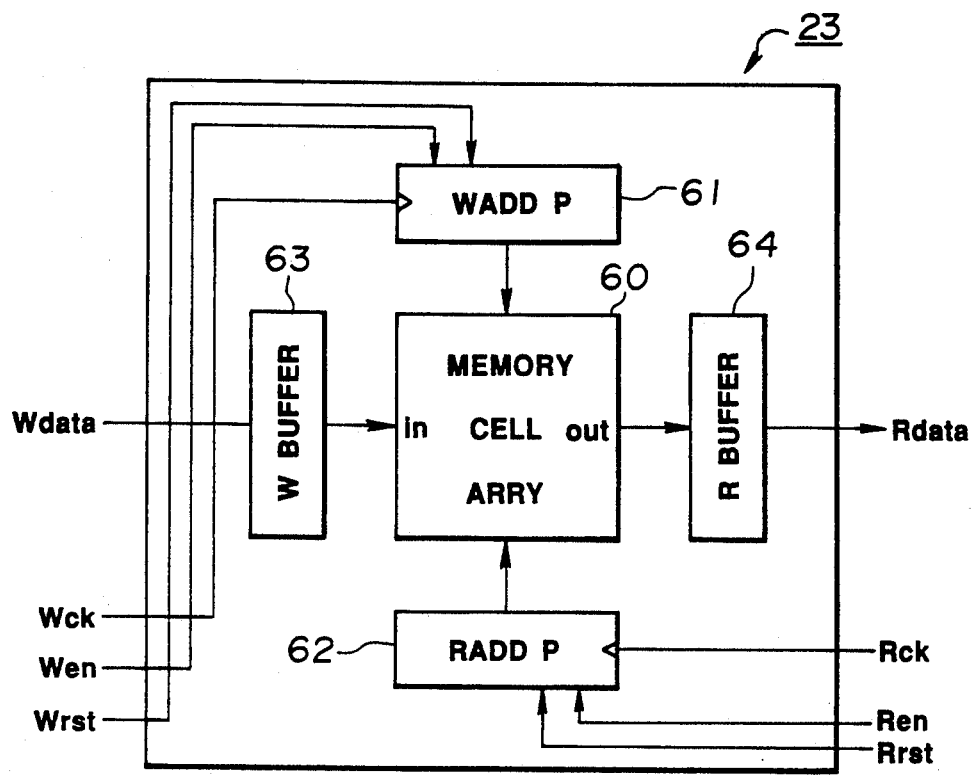
FIG. 11 is a block diagram showing an arrangement of a line memory of the aspect ratio converting circuit shown in FIG. 6.

Meanwhile, the line memory 23 of FIG. 6 is a FIFO type line memory for asynchronous data writing and reading and includes, as shown in FIG. 11, a memory cell array 60, a write address pointer 61 for applying a write address to the memory cell array and a readout address pointer 62 for applying a readout address to the memory cell array 60. Input data $W_{data}$ entered by means of an input buffer 63 are written in a memory cell of the memory cell array 60 which is designated by the write address applied from the write address pointer 61, while output data $R_{data}$ read out from a memory cell of the memory cell array 60 designated by the readout address applied from the readout address pointer 62 are outputted at an output buffer 64.

In the line memory 23, the write clock signals $W_{ck}$ and the various control signals $W_{en}$ and $W_{rst}$, generated by the write clock generating circuit 28, are supplied to the write address pointer 61, while the readout clock signals $R_{ck}$ and the control signals $R_{en}$ and $R_{rst}$, generated by the readout clock generating circuit 29, are supplied to the readout address pointer 62. To the input buffer 63, image data digitized by the A/D converter 22 are supplied as the above mentioned input data $W_{data}$.

The input data $W_{data}$, entered to the memory cell array 60 by means of the input buffer 63, are written by the write address pointer 61, during the period when the write control signal $W_{en}$ is at the logical high level, in a memory cell of the memory cell array 60 which is accessed in synchronism with the rising of the write clock signal $W_{ck}$.

Figure 12:
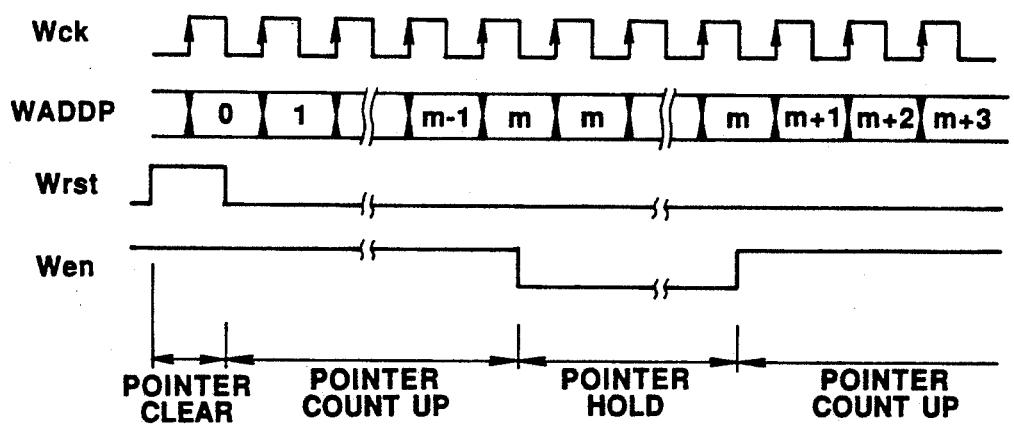
FIG. 12 is a time chart for illustrating the operation of data reading from the line memory shown in FIG. 11.

Referring to FIG. 12, the write address pointer 61 is counted up by the write clock signal $W_{ck}$, during the interval when the write control signal $W_{en}$ is at the logical high level, to access the next address memory cell of the memory cell array 60. On the other hand, when the write control signal $W_{en}$ is at the logical low level, count-up of the write address pointer 61 is inhibited. This causes data writing into the memory cell array 60 to be discontinued. The write control signal $W_{en}$ delimits the data write domain. On the other hand, during the time interval when the reset control signal $W_{rst}$ is at the logical high level, the write address pointer 61 is initialized in synchronism with the rising of the write clock signal $W_{ck}$ to access the O-address memory cell.

It is noted that the write address pointer 61, supplied with the readout clock signals $R_{ck}$ and the control signals $R_{en}$ and $R_{rst}$, generated by the readout clock generating circuit 29, performs an operation similar to that of the write address pointer 61.

The line memory 23 is capable of performing asynchronous data writing and reading, such that, by setting the frequency of the readout clock signals $R_{ck}$ so as to be equal to 4/3 times that of the write clock signals $W_{ck}$, the line memory causes the image to be compressed by a factor of ¾ in the horizontal direction to realize the image display according to the display modes 1 to 3 of the aforementioned second to fourth display systems. Meanwhile, in the display mode of the first display system (mode 0), the frequency of the write clock signals $W_{ck}$ is set so as to be equal to that of the readout clock signal $R_{ck}$.

Figure 13:
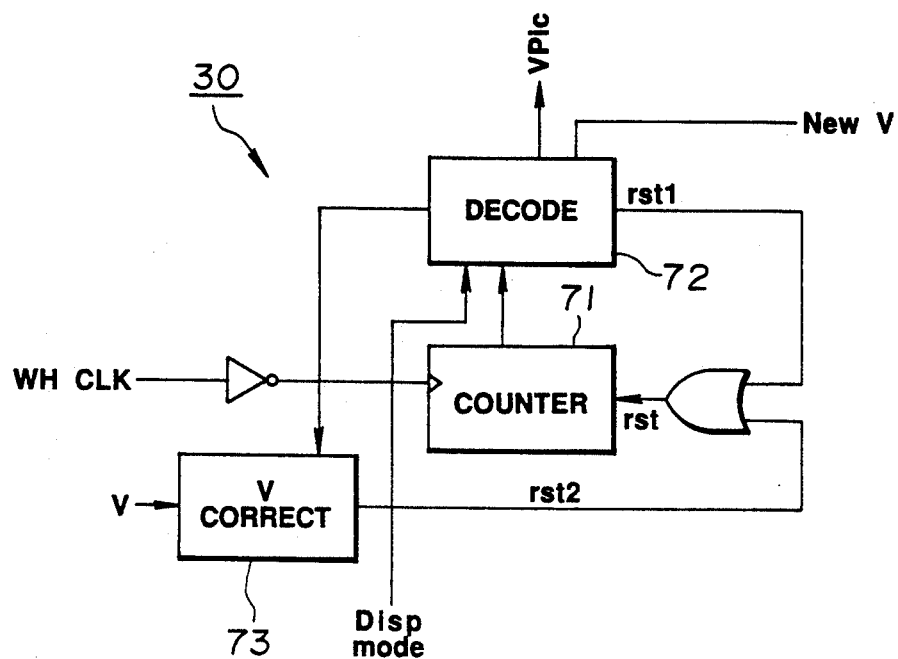
FIG. 13 is a block diagram showing an arrangement of a countdown circuit of the aspect ratio converting circuit shown in FIG. 6.

The count-down circuit of FIG. 6 is constituted, as shown for example in FIG. 13, by a counter circuit 71, to which the comparison signal 2 $HW_{ref}$ generated by the write clock generating circuit 28 is supplied as clock signal $WH_{clk}$ by means of an output buffer 46, and a decoder circuit 72 for decoding the count output from the counter circuit 71.

It is noted that the comparison signal 2 $HW_{ref}$, generated by the write clock generating circuit 28, that is the aforementioned clock signal $WH_{clk}$, has its rising edge situated at approximately the same position as the double rate horizontal synchronizing signal 2 H generated by the aforementioned frame rate doubling conversion circuit 7 and is synchronized with the horizontal synchronizing signal 2 H, although with a stationary phase error. That is, the clock signal $WH_{clk}$ may be regarded as being similar to the horizontal sync signal 2 H.

The counter circuit 71 in FIG. 13 is reset by a reset control signal rst 2 from a waveform correction circuit 73 to count 525 clock signals $WH_{clk}$, which number is equal to the number of the double-rate raster scanning lines. The reset control signal rst 2 is generated in the waveform correction circuit 73 by eliminating the jitter component from the vertical sync signal V.

Figure 14:
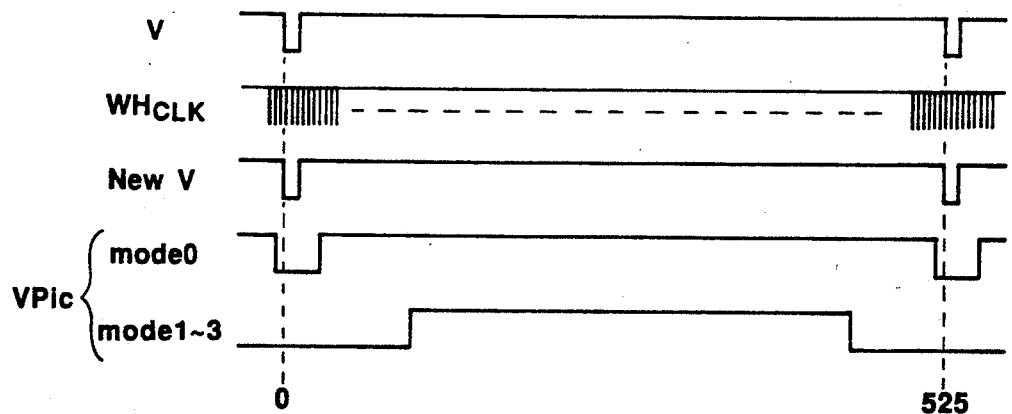
FIG. 14 is a time chart for illustrating the operation of the countdown circuit shown in FIG. 13.

The decoder circuit 72 decodes the count output from counter circuit 71 to output a new vertical synchronizing signal NEWV, and a control signal $VP_{ic}$, as shown in FIG. 14. The control signal $VP_{ic}$ is used for annexing the flanking data and indicates the image domain in the vertical direction by the logically high level.

Meanwhile, the counter circuit 71 is reset by the logical sum of a reset control signal rst 1, generated by the decoder circuit 72, and a reset control signal rst 2, generated from the vertical sync signal V by the waveform correction circuit 73. In this manner, even when the vertical sync signal V has been unable to be detected at the normal position due to, for example, the weak electrical field during broadcast reception, the stable reset control signal rst 1 guarantees correct resetting of the counter circuit 71. In order to provide for stable resetting of the counter circuit 71, the waveform correcting circuit 73 judges the relation between the clock signal $WH_{clk}$, that is the double-rate horizontal sync signal 2 H, and the vertical synchronizing signal V. If the relation is found to be within a predetermined allowable range in view of the EDTV standards, the reset control signal rst 2 is outputted and, if otherwise, the signal rst 2 is not outputted.

In the count-down circuit 30, of FIG. 6, the signal used as the clock signal for the counter circuit 71 is not the double-rate horizontal synchronizing signal 2 H, generated by the above-mentioned frame rate doubling conversion circuit 7, but rather the clock signal $WH_{clk}$ generated by the write clock generating circuit 28 from the comparison signal 2 $HW_{ref}$, so that, even when the double-rate horizontal sync signal 2 H is interrupted under the nil-signal state caused by, for example, a weak electrical field during broadcast reception, the clock signal $WH_{cek}$ continues to be output due to the free-running of the voltage-controlled oscillator 43 of the write clock generating circuit 28. Thus the counter circuit 71 of FIG. 13 may continue its counting operation to output the vertical synchronizing signals NEWV and the control signals $VP_{ic}$ as stable signals.

Figure 15:
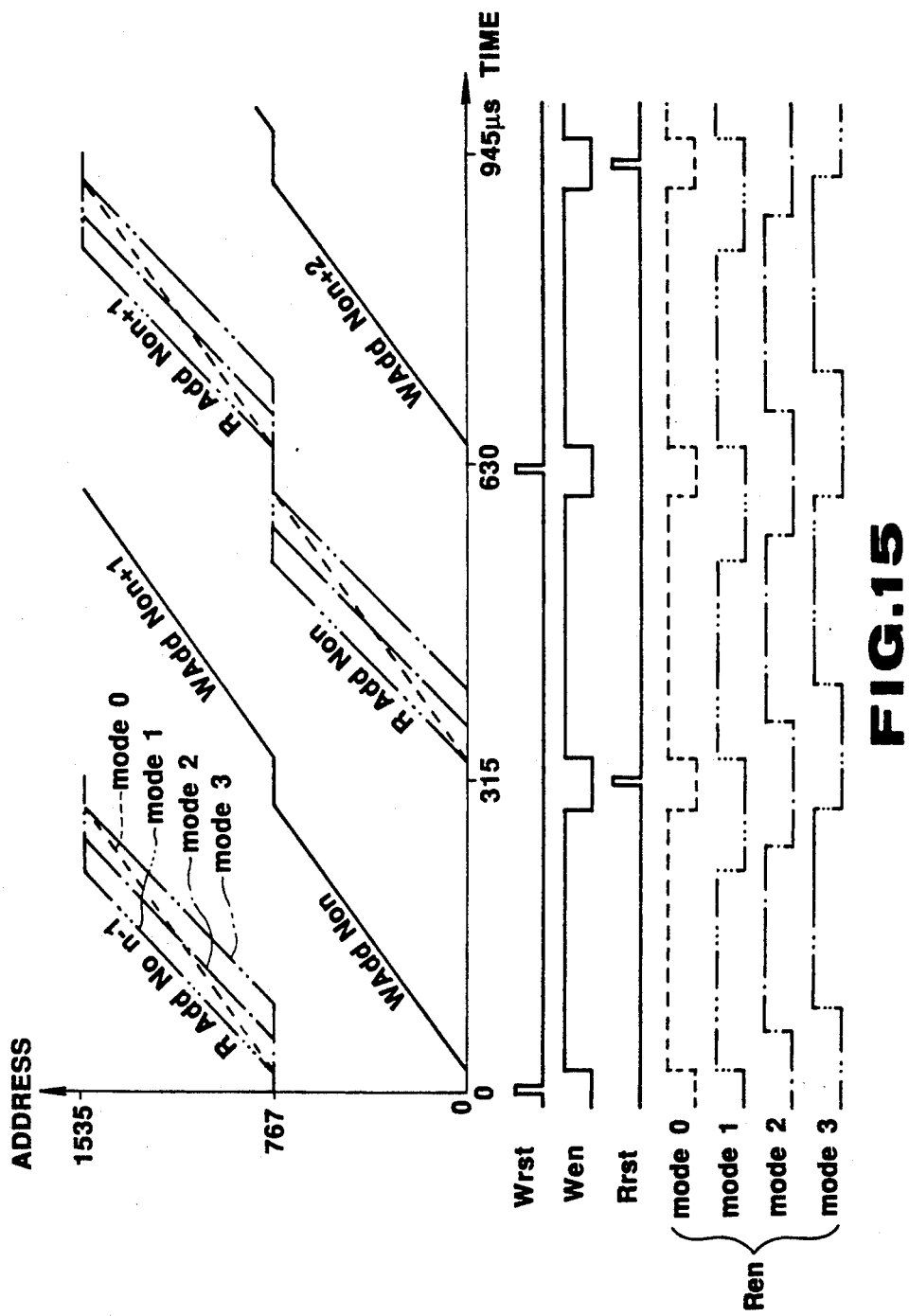
FIG. 15 is a time chart for illustrating the operation of the aspect ratio converting circuit of FIG. 6 in each of the display modes.

FIG. 15 shows the relation between the control signal $W_{en}$ and $W_{rst}$, generated by the write clock generating circuit 28, and the control signals $R_{en}$ and $R_{rst}$, generated by the readout clock generator 29 for the display modes (modes 0 to 3), and the relation between the addresses of the write address pointer 61 and the readout address pointer 62 within the line memory 23.

In the above described aspect ratio converting circuit 8 of FIG. 6, the dot-sequential mode video signals generated by the frame rate doubling conversion circuit 7, that is, the double-data video signals, are bandwidth limited by the low-pass filter 21 and processed by anti-aliasing processing before being supplied to the A/D converter 22 where the signals are digitized. The digitized video data from the A/D converter 22 are supplied to and written in the line memory 23 in accordance with the write clock signals $W_{ck}$ generated by the write clock generating circuit 28 and the control signals $W_{en}$ and $W_{rst}$.

Meanwhile, the write control signal $W_{en}$, generated by the write clock generating circuit 28, falls to a logical low level during the blanking domain of the input video signal, so that data writing in the line memory 23 is interrupted during this domain and data writing is performed only during the image domain necessary for processing so as to save the storage capacity of the line memory 23. The data of the blanking domain not written at this time are added at the readout side circuit.

The reset control signal $R_{rst}$, generated by the readout clock generating circuit 29, adapted for performing readout control of the line memory 23, is generated at a position delayed by one horizontal scanning period with respect to the reset control signal $W_{rst}$ generated by the write clock generating circuit 28, thereby preventing collision between the readout address and the write address.

Since compression in the horizontal direction is not performed with the display mode of the first system (mode 0), the readout control signal $R_{en}$, generated by the readout clock generating circuit 29, is coincident in timing with the write control signal $W_{en}$. With the present display mode (mode 0), since the write clock signal, the write clock signal $W_{ck}$ and the readout clock signal $R_{ck}$ are of the same frequency, the video data read out from line memory 23, delayed by 1 H from the data at the write side, are substantially the same as the latter data.

With the display mode according to the second to fourth systems (modes 1 to 3), video data are read out from the line memory 23 during the domain when the readout control signals $R_{en}$ associated with the respective display modes are at the logical high level, so that the image is displayed at the corresponding position. In these display modes, the frequency of the readout clock signal $R_{ck}$ is four-thirds that of the write clock signal $W_{ck}$, so that the image data in the line memory 23 is read out at a rate equal to four-thirds of that at the write side, as a result of which a display image compressed to three-fourths in the horizontal direction is obtained.

The control signal $HP_{ic}$, generated by the readout clock generating circuit 29, is at the logical high level within the region of the image to be displayed in the horizontal direction, that is, within the effective display period, in each of the display modes 0 to 3.

Figure 16:
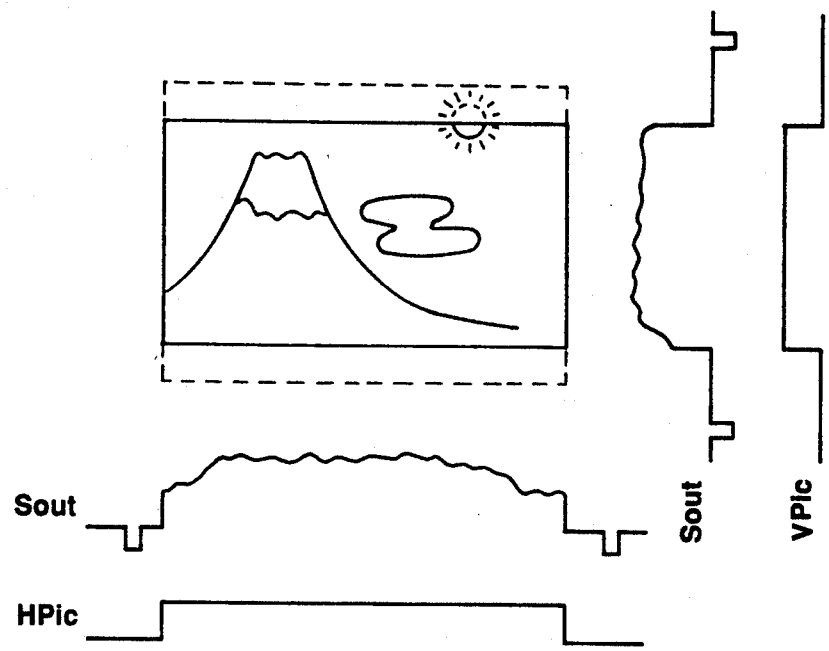
FIG. 16 is a schematic waveform diagram for explaining the position of generation of a control signal used for actuating an automatic pedestal processing circuit during the period of effective display of the image signals in the display mode for displaying the image on the overall display screen having the wide aspect ratio by cutting upper and lower regions of the image of the image signals with the standard aspect ratio.
Figure 17:
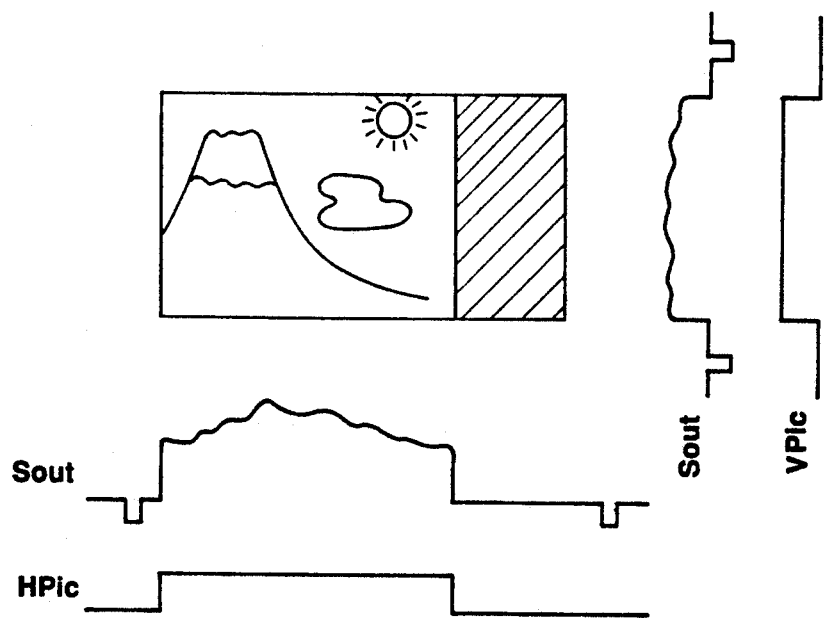
FIG. 17 is a schematic waveform diagram for explaining the position of generation of a control signal used for actuating an automatic pedestal processing circuit during the period of effective display of the image signals in the display mode for displaying the image of the image signals of the standard aspect ratio on a left-hand region of the display screen of the wide aspect ratio by making the right-hand side region of the display screen with the wide aspect ratio.
Figure 18:
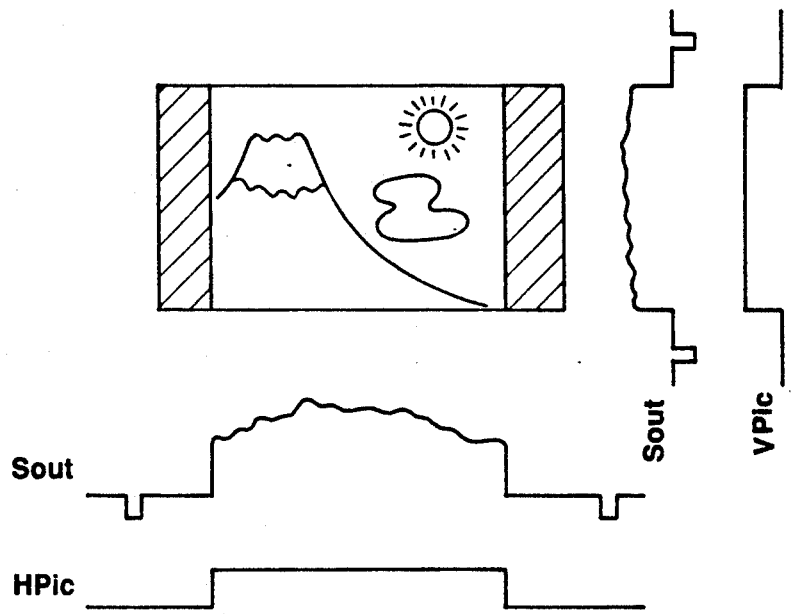
FIG. 18 is a schematic waveform diagram for explaining the position of occurrence of a control signal used for actuating an automatic pedestal processing circuit during the period of effective display of the image signals in the display mode for displaying the image of the image signals with the standard aspect ratio in the center of the display screen having the wide aspect ratio by masking the left- and right-hand side reigons of the display screen having the wide aspect ratio.
Figure 19:
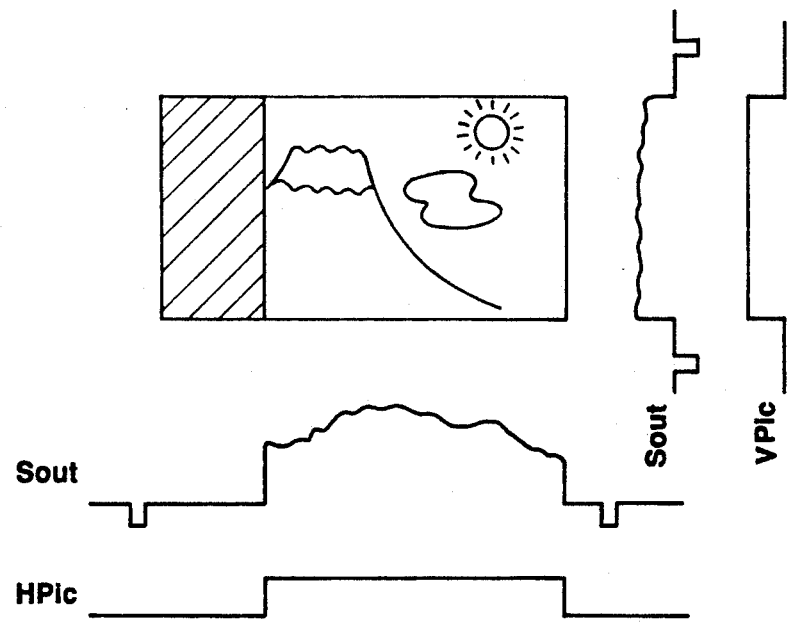
FIG. 19 is a schematic waveform diagram for explaining the position of occurrence of a control signal used for actuating an automatic pedestal processing circuit during the period of effective display of the image signals in the display mode for displaying the image of the image signals with the standard aspect ratio in the right-hand side region of the display screen having the standard aspect ratio by masking the left-hand side region of the display screen having the wide aspect ratio.

FIG. 16 shows the display state for the display mode 0 wherein upper and lower regions of the image of the standard aspect ratio are cut to display the image on the overall display screen having a wide aspect ratio. FIG. 17 shows the display state in the display mode 1 in which the right-hand side region of the display raster of the wide aspect ratio is masked to display the image of the image signals of the standard aspect ratio on the left-hand side of the display screen of the wide aspect ratio. FIG. 18 shows the display state in the display mode 2 in which left-hand and right-hand side regions of the display raster having the wide aspect ratio are masked and the image of the image signals having the standard aspect ratio is displayed in the middle of the display raster of the wide aspect ratio. Finally, FIG. 19 shows the display state in the display mode 3 in which the left-hand side region of the display raster of the wide aspect ratio is masked and the image of the image signals of the standard aspect ratio is displayed in the right-hand side region of the display raster of the wide aspect ratio.

The control signal $HP_{ic}$ from readout clock generating circuit 29 in FIG. 6 is inverted in polarity by inverter 32 so as to be supplied as a changeover control signal to the frame data addition circuit 24. The frame data addition circuit 24 is constituted by a switch circuit which is adapted for selecting the line memory 23 when the switching control signal is at the logical low level, and which is adapted for selecting a frame data output section 33 when the changeover control signal is at the logical high level to affix frame data to those portions of the image data read out from the line memory 23 which are outside the effective image display region.

The control signal $VP_{ic}$, generated by the countdown circuit 30, is at the logical high level within the region of the image to be displayed in the vertical direction, that is, during the effective display period. This display signal $VP_{ic}$ has different signal-generating timings between the display mode of the first display system (mode 0) and the display mode of the other display systems (modes 1 to 3).

The above mentioned control signal $VP_{ic}$, indicating the effective display period in the vertical direction by the logical high level is inverted in polarity by inverter 36, and supplied to an OR gate 34 that performs the logic OR operation between the inverted signal $VP_{ic}$ and the control signal $HB_{ik}$ from the readout clock generating circuit 29. The logical sum output from this OR gate 34 is supplied to the blanking data affixing circuit 25 as a changeover control signal.

This blanking data affixing circuit 25 is constituted by a switch circuit, which is adapted to select the frame data affixing circuit 24 or the blanking data output section 37 when the changeover control signal is at the logical low level or at the logical high level, respectively. Vertical and horizontal blanking data are affixed by the blanking data affixing circuit 25 to the video data, to which the frame data have been affixed by the frame data affixing circuit 24 as described previously.

The output data from the blanking data affixing circuit 26 are converted by the D/A converted 26 into analog signals and processed by a low-pass filter 27 for anti-aliasing so as to be outputted as the image signals of the display modes 0 to 3.

On the other hand, the control signal $HP_{ic}$, indicating the horizontal effective display period, formed by the readout clock generating circuit 29, by the logical high level, and the control signal $VP_{ic}$, indicating the vertical effective display domain, formed by the countdown circuit 30, by the logical high level, are transmitted to an AND circuit 35, where the AND operation is taken of these two signals. The AND output of the AND gate 35, indicating the effective display domain of the image signal of the display modes 0 to 3 by the logical high level, is supplied to the control input terminal 10A of the automatic pedestal processing circuit 10 as the operation control signal $P_{ic}$.

In this manner, the automatic pedestal processing circuit 10 is in operation only during the effective display period in the display modes 0 to 3, so that optimum automatic pedestal processing may continously be made without malfunctions otherwise caused by detection of the signals during the ineffective display period, that is, during the period other than the effective display period.

I claim:

1. A display apparatus for displaying image signals contained in input television signals formed of scanning lines with a blank periods and display periods comprising:
    receiving means for receiving at least two types of television signals, the aspect ratio of a first type of the television signals being wider than the aspect ratio of a second type of the television signals and having different respective display periods;
    display means for displaying said television signals, said display means having an aspect ratio of said first type of the television signals;
    aspect ratio converting means for converting said second type of television signals for display on said display means;
    detecting means for detecting a predetermined minimum level of image signals in the input television signals;
    automatic pedestal processing means for controlling the signal level of said image signals using output signals of said detecting means; and
    control means for determining a display period of the input image signals and controlling said automatic pedestal processing means only within the determined display period of said image signals, wherein said control means generates a window signal so as to pass said image signals to said automatic pedestal processing means only during said determined display period of said image signals.

2. A display apparatus according to claim 1 wherein said control means generates a selecting signal fed to said aspect ratio converting means for selecting one of a number of modes for displaying said second type of television signals on said display means, in a first of said number of modes said second television signal is overscanned in the vertical direction of said display means and in a second of said number of modes the display period of said second television signal is displayed on said display means with frame data.

3. A display apparatus according to claim 2 wherein said aspect ratio converting means includes adder means for adding said frame data to said second type of television signals so as to have the same aspect ratio on said display means in said second mode.

4. A display apparatus according to claim 2 wherein said first mode creates display signals scanned on a visible display area on said display means and a non-display signal scanned on a non-visible display area thereon, and in which said non-display signal is scanned in upper and lower areas of said visible display area.

5. A display apparatus according to claim 2:
    wherein said first type television signal is based on MUSE television format and said second type television signal is based on NTSC television format.

6. A display apparatus according to claim 2:
    wherein said aspect ratio of said second type television signal is 4:3 and said aspect ratio of said first type television signal is 16:9.

* * * * *